Patented Dec. 11, 1945

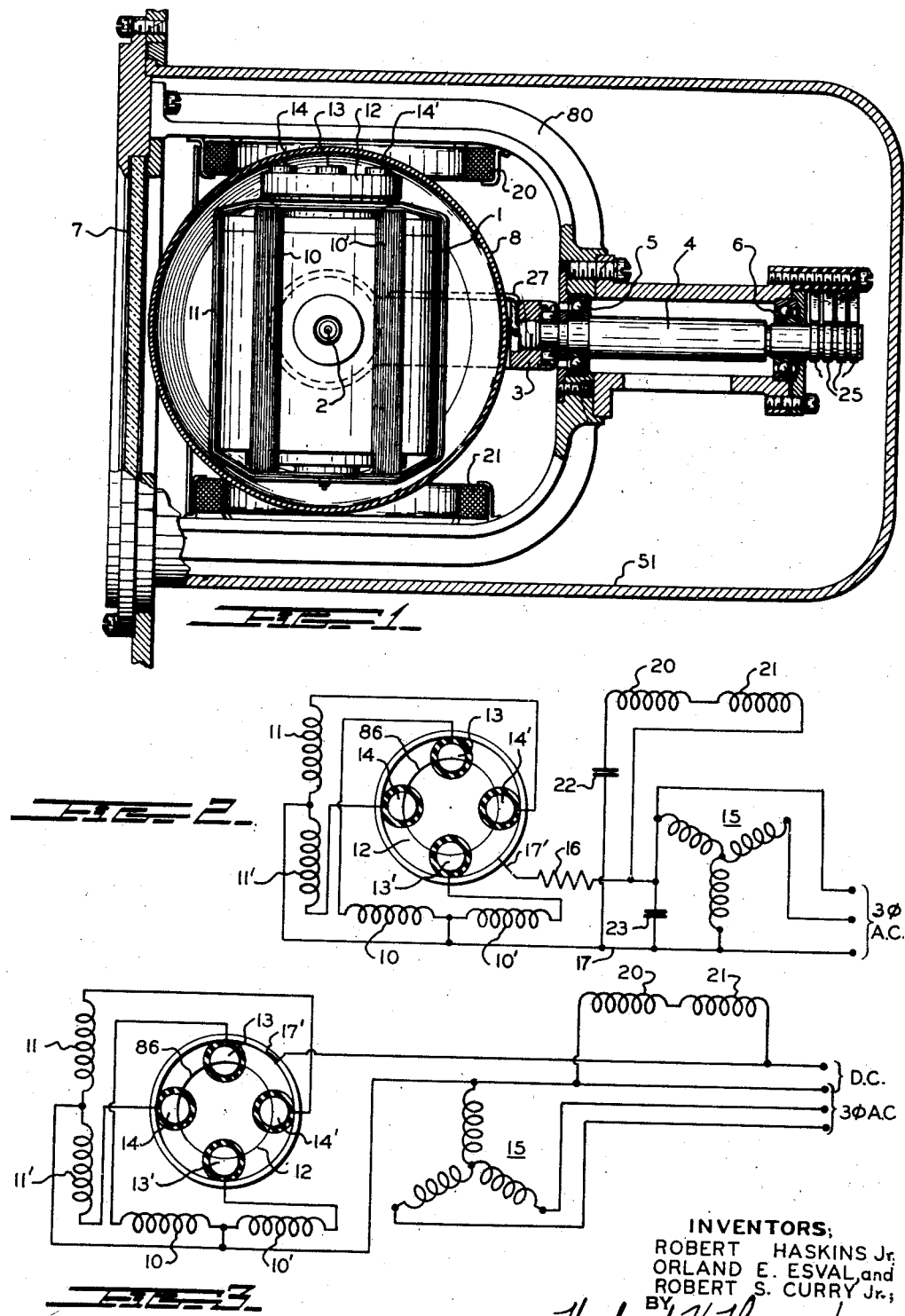

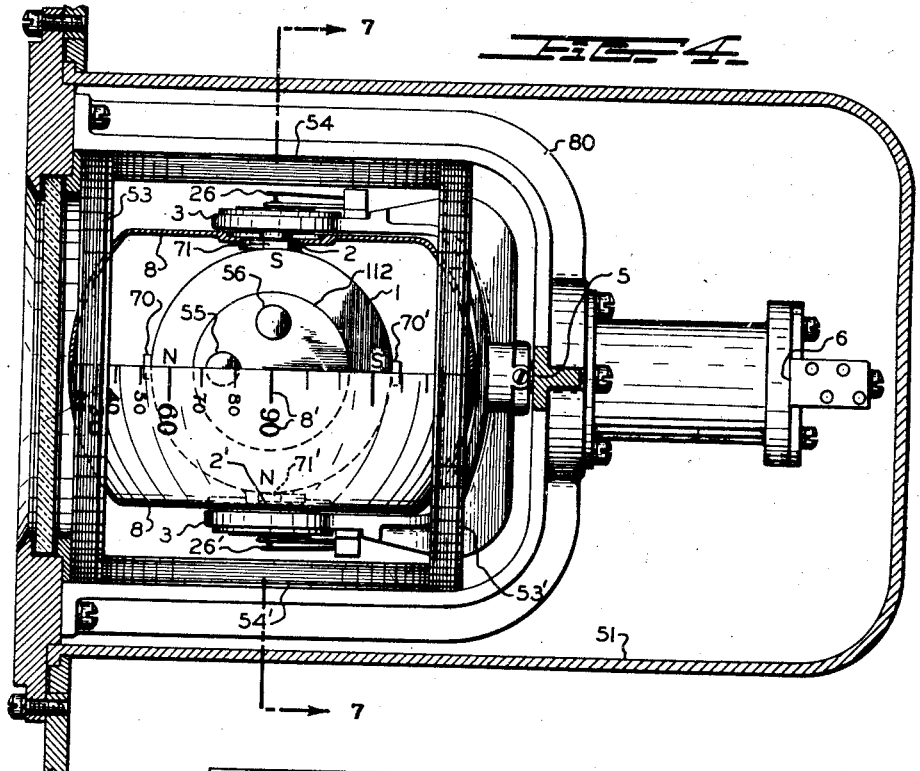
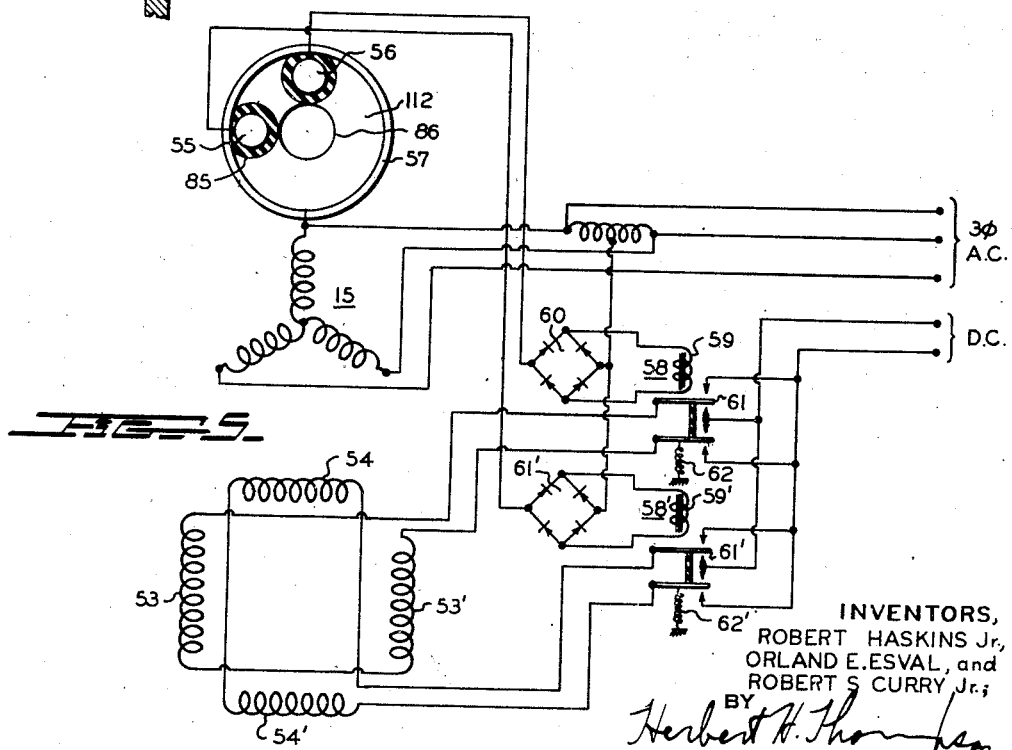

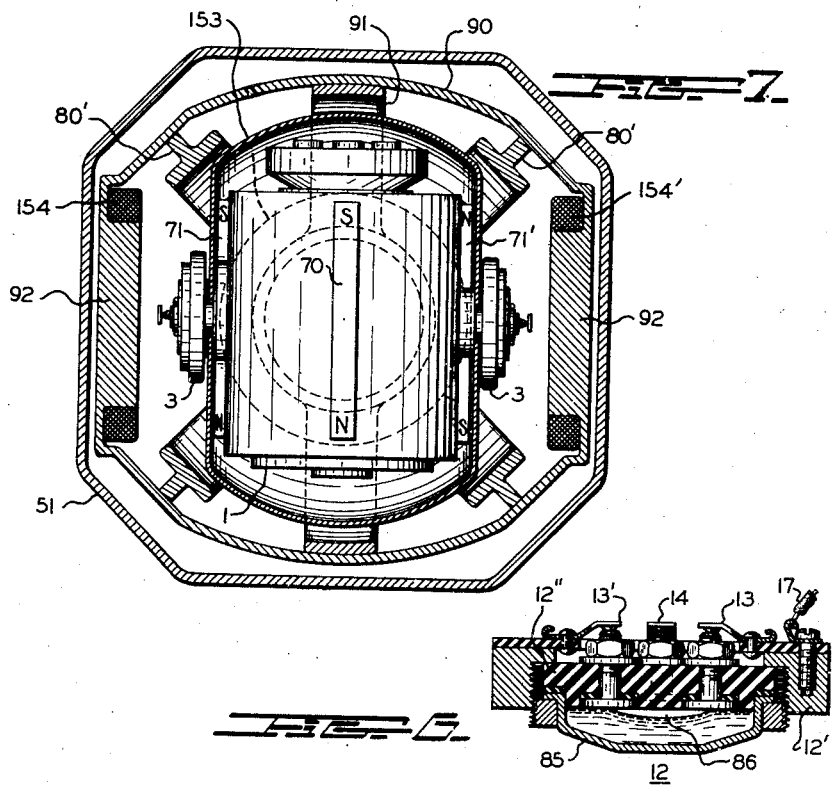
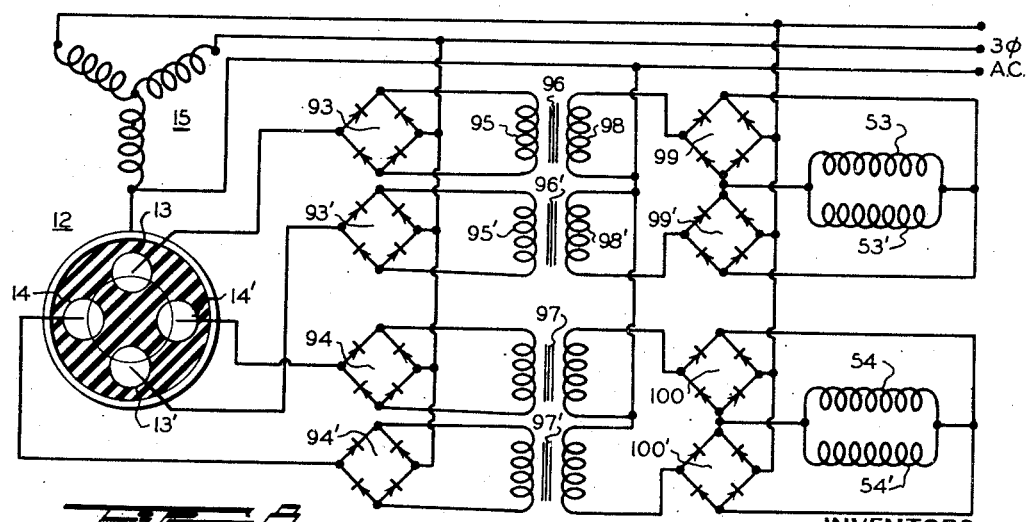

2,390,532

UNITED STATES PATENT OFFICE 2,390,532

MAGNETIC ERECTION DEVICE FOR GYROSCOPES

Robert Haskins, Jr., Garden City, Orland E. Esval, Huntington, and Robert S. Curry, Jr., Baldwin, N. Y., assignors to Sperry Gyroscope Company, Inc., Brooklyn, N. Y., a corporation of New York Application October 28, 1942, Serial No. 463,714

19 Claims. (Cl. 74—5)

This invention relates to gyroscopic artificial horizons or gyro-verticals and, more particularly, to gravitationally controlled torque applying means for causing the same to remain truly vertical. The invention particularly concerns an improvement in electromagnetic torque applying devices of this character for applying a torque about one or both horizontal axes of the gyroscope to return it to the vertical if displaced, and which are usually controlled by some form of gravitational device associated with the gyroscope for detecting tilt thereof.

According to our invention, we erect the gyroscope by a plurality of interacting magnetic fields, namely, a field or fields set up by one or more coils mounted independently of the gyroscope, such as by being fixed to the gyro housing, and one or more magnetic field producing means secured to the gyro rotor case. By controlling either one of such fields from a gravitationally responsive controller, we exert a torque on the gyroscope about a horizontal axis normal to the axis of tilt for maintaining the same erect. In one form of the invention both the interacting fields are produced by electrically excited coils preferably excited with alternating current, one coil or set of coils being fixed to the outer housing and the other set of coils mounted on the gyro rotor casing. The former set is preferably continuously excited at a constant effective value and the latter set controlled from the aforementioned gravitational controller so as to have a variable effective value and sign with respect to said first coil.

In another form of the invention, the field producing means is secured to the gyro casing in the form of a plurality of permanent magnets, while the fixed coils are controllably excited with direct current from the gravitationally responsive controller. In this form of the invention a novel arrangement of magnets is employed so that the instrument will remain operative regardless of the reversal of gyro position which might take place during acrobatics as the gyro passes through the gimbal-lock position.

Referring to the drawings, illustrating several forms our invention may assume,

Fig. 1 is a side elevation, partly in section, of a gyro-vertical embodying the first-mentioned form of the invention.

Fig. 2 is a wiring diagram for the same.

Fig. 3 is a modified wiring diagram for the same.

Fig. 4 is a plan view, partly in section, of a modification of our invention using permanent magnets on the gyroscope.

Fig. 5 is a wiring diagram for the same.

Fig. 6 is a sectional detail of the preferred form of liquid level switch employed as a gravitational controller.

Fig. 7 is a transverse section of a gyro-vertical taken on line 7—7 of Fig. 4 but varying from the structure of the form shown in Fig. 4 in certain minor particulars.

Fig. 8 is a wiring diagram showing a modified relay means usable in connection with the form of the invention shown in Figs. 4 and 7.

The form of gyro-vertical disclosed in Fig. 1 is of the type known as the universal attitude gyro, disclosed in the copending application of Orland E. Esval, Walter Wrigley and Robert Haskins, Jr. (two of whom are joint inventors of this application), Serial No. 445,760, for Attitude gyro, filed June 4, 1942. In this particular form of gyroscope, the rotor proper (not shown) is journaled within the rotor casing 1 on a vertical spinning axis, which casing is mounted for oscillation about a horizontal axis on trunnion bearings 2, 2' within a forked or gimbal half-ring 3 which is journaled for oscillation about a second horizontal axis normal to the first axis by being secured to a long trunnion or shaft 4 journaled in two spaced bearings 5 and 6 lying to the rear of the gyroscope. In this manner the forward half of the gyroscope is entirely visible through the front window 7. To indicate the horizontal, the gyro case is surrounded by a concave thin split ring 8 on which suitable markings 8' are placed (see Fig. 4). It will be observed that in this type of gyroscope the indications may be directly read regardless of whether the gyroscope is in the position shown in Fig. 1 or whether viewed from what is now the back of the indicating shield, since the shield is graduated through 360° and the indications may be especially marked as described in the aforesaid application.

For erecting the gyroscope we preferably place on the rotor casing, coils 10 and 11, the former being shown as having its axis in line with the axis of the main trunnion pivots 5 and 6 and the latter being shown as having its axis in line with the minor trunnion pivots 2, 2'. Preferably, both coils 10 and 11 are divided, as shown, forming two pairs of coils 10, 10' and 11, 11' for the sake of symmetry. Current is controllably supplied to said coils, preferably by means of a suitable gravitational controller mounted on the gyro casing 1. This is shown in the form of a liquid container 12, which may be similar to that shown in the prior application of Orland E. Esval, one of the present joint inventors, and John R. Muma, Serial No. 428,040, for Tilt correcting device, filed January 24, 1942. Said container may be almost filled with conducting liquid, such as acidulated water or alcohol, or mercury, leaving an air bubble 86, and the top 12" is made of insulating material and provided with a plurality of conducting buttons or contacts 13, 13' and 14, 14', each insulated from the other. Single phase alternating current may be supplied to the buttons and coils from the polyphase A. C. supply for the rotor windings 15, which spins the rotor. For this purpose one supply lead 17 is shown as connected oppositely to each of the coils 10, 10', 11 and 11', the other ends of the respective coils being connected to respective buttons 13, 13', 14 and 14', as shown, while another lead 17' is connected through a resistor 16 to the conducting frame 12' and bottom 85 of the container 12, said resistor operating to regulate the current and reduce the voltage.

Preferably two cooperating fixed coils are employed, one (20) above and the other (21) below the gyroscope and both fixed to the framework or fork 80 fixed within the outer housing 51. Said coils are continuously supplied from the same leads 17 and 17' as shown in Fig. 2. A condenser 22 is shown in series with coils 20 and 21 to maintain proper phase relationship between the currents in the fixed and movable coils, and a second condenser 23 may be used to balance the induction current component to reduce the line load.

When the gyroscope is vertical, the air bubble 86 in the controlling switch is central, so that all four contacts are live (or all dead depending on the size of the air bubble) and the current flowing through the several pairs of coils balanced or nil, so that no torque is exerted on the gyroscope. When, however, the gyroscope becomes inclined, for instance the top tilts forwardly about axis 5—6, i. e., out of the plane of the paper in Figs. 1 and 2, contact 13 will be broken or the resistance therethrough greatly increased and contact 13' will become more conductive, thus reducing or breaking the current through coil 10 and increasing the current through opposed coil 10', which act about axis 2—2' at right angles to the tilt axis. This causes a torque about axis 2—2' in the proper direction to erect the same about axis 5—6, assuming the proper direction of rotor spin.

Similarly, rearward tilt would increase the current through coil 10 and decrease it through coil 10' to produce an opposite torque about axis 2—2', and tilt about axis 2—2' would differentially excite coils 11 and 11' in the same manner to produce erecting torques about axis 5—6.

Current is shown as led into the gyroscope for spinning and erecting purposes through slip rings 25 on trunnion shaft 4, which is preferably made hollow to carry the cable 27 which carries the wires into the gyro casing through suitable contact means 26 and 26' (see Fig. 4) on the horizontal axis 2—2'.

It will be noted that since the controlling switch and the coils 10 and 11 are all on the gyro case, it is not necessary to carry the wires between the controller and the coils through the gimbals of the gyroscope, and also that for the same reason the erection device will remain operative regardless of which side of the gyro faces the front window.

In Fig. 3 is shown a slight modification of the wiring diagram showing that direct current may be employed for the control buttons and solenoids, while retaining alternating current for spinning the rotor. Only four slip rings are required since one lead is common between the three-phase A. C. supply and the direct current supply.

In the form of the invention shown in Fig. 4, the gyroscope illustrated is of the same form, the liquid level controller being shown at 112. In this case, however, the coils which are controlled from the switch are not mounted on the gyro case, but are fixed within the housing 51 on frame 80. Preferably two pairs of such coils are employed, coils 53 and 53' placed forward of and behind the rotor casing with their axes in line with the main trunnion axis 5—6, and coils 54, 54' placed at the two sides of the gyroscope with their axes normally in line with minor axis 2—2'. It is therefore necessary to lead the control wires from the controller switch 112 through the gimbal axis of the gyroscope, and in order to reduce such leads to a minimum we have shown the switch as provided with only two upper contacts 55 and 56. As in Fig. 2, taps from the three-phase supply for the rotor 15 may be used to supply single-phase current for the controller switch 112, but in this case it is necessary to rectify the current before it is supplied to the controlling coils. For this purpose we employ a pair of relays 58, 58', the coils 59, 59' of which are excited from buttons 56, 55 through rectifiers 60 and 60'. Each relay controls a double switch arm 61 or 61' normally biased in one position by a spring 62 or 62' to close the lower contacts, but are moved against their upper contacts upon excitation of the respective coils 59, 59'. Switch 61 is shown as directing current in one direction or the other through the two series connected coils 53 and 53', while the relay 61' similarly directs current in one direction or the other through series coils 54 and 54'.

With the air bubble in the controller central and of moderate size, both coils 59 and 59' will be excited and hence current will pass in one direction through both pairs of coils, causing slow precession of the gyroscope at an acute angle to axes 5—6 and 2—2'. The resulting slight tilt will cause the air bubble to break, or greatly reduce, the current through one or both buttons 55, 56 dependent on the exact direction of tilt. If the circuit through 55 alone is broken, switch 61' will move downwardly to reverse the current in coils 54 and 54', thus starting precession about an axis to correct the tilt. If the tilt is in a direction to break the current through both coils, both switches will move downwardly, reversing the current in both coils, in either case causing precession in the opposite direction to the tilt. The result is that the gyroscope will continuously precess or hunt through a very small angle, on the order of a few minutes, in seeking the vertical, but will at all times remain as close to the vertical as need be.

The cooperating constant magnetic field in this case is produced by permanent magnets attached, preferably, to the forward side of the gyroscope case 1. While all magnets might be placed with their poles in the same direction, we prefer to place the poles of the two magnets of each pair in opposite directions for the reasons hereinafter developed. Thus, magnet 70, cooperating with coil 53, is shown as having its north pole on top, while the opposite magnet 70', cooperating with coil 53', is shown as having its south pole on top.

Similarly, magnet 71, cooperating with the side coil 54, is shown with its south pole on top, while the opposite magnet 71', cooperating with the other coil 54', has its south pole on the bottom.

By employing this system we maintain a proper relationship between the contacts in the switch 12' and the cooperating magnetic fields induced between the magnetic system and the stationary coils. It has been found in performing acrobatics or other unusual maneuvers in aircraft, that although the spin axis of the gyroscope always remains in substantially the same vertical position, the gyro casing is often turned through 180° in azimuth, especially when the aircraft assumes an almost vertical dive or climb position. In this case the instrument passes through what is known as "gimbal lock," in which the gimbal ring flips over to bring the rear side of the ring and rotor casing to the front, although the case at the time remains vertical by turning about its minor trunnions. If this happens, it will be obvious that contact 55, if initially positioned at the forward side of the gyroscope, would then lie at the rear side of the casing. Therefore it would tend to send current through the coils in the reverse direction from that in the first assumed position. If only one magnet were employed or if both magnets had their north poles in the same position, the gyroscope would hence become inoperative. However, under such conditions the magnet 70' will be brought to the front of the instrument and the magnet 70 to the rear of the instrument, so that they then will be cooperating with the other oppositely wound coil. Similarly, magnets 71 and 71' are interchanged from right to left. By thus reversing both magnetic fields, correct erection is maintained at all times.

The opposite positioning of the individual magnets in each pair also possesses the important advantage that the effect of the so-called vertical component of the earth's field on the magnetic system is thereby eliminated. It is well known that the earth's magnetic field is inclined both to the horizontal and vertical, the horizontal component being directed toward the magnetic poles. Therefore this field will exert on any magnet pivoted about a horizontal axis and placed vertically therein, a torque, tending to align it with the earth's magnetic field, which would vary in effect with the position in azimuth of the horizontal axis about which the magnet is pivoted. It is also recognized that the vertical component of the earth's field varies in direction and intensity from point to point, so that it is not readily compensated for. By employing a pair of oppositely directed magnets about each horizontal axis of the gyroscope, we cancel the effect of the earth's field on the magnetic system and thus avoid a source of possible error.

A slight modification of the form of the invention shown in Fig. 4 is illustrated in Fig. 7, which represents a transverse section the position of which is represented by the line 7—7 of Fig. 4. According to this modification a magnetic path is provided between the respective coils of each pair of erecting coils 154, 154' and 153, 153' by means of soft iron frames 90 and 91 connecting the coils of each pair and supported on the four-arm bracket 80'. Coils 154 and 154' are shown as mounted on cores 92 forming a part of the frame 90.

It is of course understood that the electrical circuits between the controller and the erecting coils may be varied widely within the scope of our invention. Thus, we have illustrated in Figs. 2 and 3 two of the many forms of circuits that may be employed for the form of the invention shown in Fig. 1, and we have shown in Fig. 8 another form of circuit that might be employed in connection with the form of the invention shown in Figs. 4 and 7, which has the advantage that no separate source of direct current need be supplied, as in Fig. 9.

In Fig. 8, four buttons are employed instead of two in the controller and a system of saturable reactors is employed as a relay in combination with a plurality of rectifier bridges used in conjunction with the polyphase supply to the rotor 15 for controlling the erection coils from the liquid controller. As shown, we place a pair of rectifier bridges 93, 93' or 94, 94' across each pair of conducting buttons so that alternating current flows through the buttons and liquid from the supply, while direct current derived from the output thereof flows through the saturating or control coil 95 of each of the four saturable reactors 96, 96', 97, 97', the current through the contacts of each pair varying oppositely in magnitude with the position of the air bubble 86. We then supply alternating current to the second windings 98 of each of the saturable reactors through a second set of rectifier bridges 99, 99' and 100, 100'. Therefore the direct current which appears in the outputs of each of the bridges last named will vary in magnitude and direction with the relative variation of the magnitude of the direct current supplied to reactors 96 and 96', so that direct current is sent through the erecting coils 53 and 53' in one direction or the other in accordance with the tilt of the gyroscope. The same is true as to the current in windings 54 and 54' controlled from the relative magnitude of the direct current in reactors 97, 97'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. Erecting means for gyro verticals having a universally mounted rotor casing, fixed means for creating a magnetic field along an axis of the gyroscope, means for creating a reversible field along an axis normally perpendicular to said first axis for interacting with the first-mentioned field, means for creating a second reversible field along an axis normally perpendicular to both said other axes for also interacting with said first-mentioned field, said last two means being on said casing, and a gravitationally responsive controller responsive to tilt of the gyroscope and connected to excite either of said reversible means in one direction or the other for producing a torque about either of said horizontal axes in either direction to erect the gyroscope.

2. An erecting means for gyro verticals as claimed in claim 1, wherein said first-named magnetic field producing means comprises a fixed horizontal coil around the gyroscope producing a symmetrical vertical field and said second and third field producing means comprise pairs of mutually perpendicular coil means on the rotor casing with their axes respectively in line with the gimbal axes of the casing.

3. Erecting means for gyro verticals having a universally mounted rotor casing, fixed means for creating a magnetic field along an axis of the gyroscope, means for creating a reversible field along an axis normally perpendicular to said first axis for interacting with the first-mentioned field, means for creating a second reversible field along an axis normally perpendicular to both said other axes for also interacting with said first-mentioned field, said last two means being on said casing, and a liquid level device on said casing partially filled with a conducting liquid and having two pairs of contacts on its upper surface, one pair controlling the strength and direction of one of said reversible fields and the other pair controlling the strength and direction of the other of said fields.

4. In erecting means for gyro verticals for aircraft having a universally mounted rotor casing, permanent magnets mounted fore and aft on said casing with their north poles lying in opposite directions, a fixed coil adjacent the forward side of said case, a second fixed coil adjacent the rear of said case, and gravitationally controlled means on the gyro casing for exciting said coils to create a flux field adjacent each coil in opposite directions, each field cooperating with the adjacent magnet to produce torque on the gyroscope in the same direction, whereby in case the gyro casing is turned 180° in azimuth with respect to the aircraft, the controller and coils will continue to produce proper erection by the interchange in position of the magnets at the time the control between the controller means and coils is reversed.

5. Erecting means for gyro verticals having a universally mounted rotor casing, means for creating an alternating magnetic field of constant effective value adjacent the gyroscope, a pair of coils for creating opposing alternating magnetic fields adjacent the gyroscope, one of said means being on said casing and said two fields being normally perpendicular, an alternating current supply for said means and coils, and a liquid level variable impedance device mounted on said casing and differentially connected between said supply and said coils to vary the relative strength of said coils and thereby to controllably produce a field, which interacts with said first-named field to produce a torque in either direction on the gyroscope to erect the same.

6. Erecting means for gyro verticals having a rotor bearing casing mounted in neutral equilibrium for oscillation about a pair of mutually perpendicular horizontal axes and a rotor journaled therein for spinning about a vertical axis, means for creating a magnetic field of constant magnetic effect along said vertical axis, means for creating a second field of variable magnetic effect along one of said horizontal axes, means for creating a third field of variable magnetic effect along the other horizontal axis, said second and third fields interacting with said first-mentioned field to selectively produce a torque about one or the other horizontal axis of the gyroscope, and a gravitationally responsive controller responsive to tilt of the gyroscope about either of said horizontal axes for controlling either or both of said second and third field creating means to thereby cause a torque on the gyroscope about an axis normal to the axis of tilt.

7. Erecting means for gyro verticals as claimed in claim 6, wherein said first-named field creating means comprises a fixed horizontal coil having its axis in line with the axis of spin of the gyroscope, and said other field creating means comprises a pair of vertical coils on the gyro casing placed at right angles to one another.

8. In erecting means for gyro verticals for aircraft having a universally mounted rotor casing, permanent magnets mounted one on each side of said casing with their north poles lying in opposite directions, a fixed coil adjacent one side of said case, a second fixed coil adjacent the other side of said case, and gravitationally controlled means on the gyro casing for exciting said coils to create a flux field adjacent each coil in opposite directions, each field cooperating with the adjacent magnet to produce torque on the gyroscope in the same direction, whereby in case the gyro casing is turned 180° in azimuth with respect to the aircraft, the controller and coils will continue to produce proper erection by the interchange in position of the magnets at the time the control between the controller means and coils is reversed.

9. In an erecting means for a gyro vertical spun by an alternating current supply, permanent magnet means associated with the gyroscope for creating a uniform field, coil means for producing a variable field cooperating with said uniform field to produce a torque on the gyroscope, a liquid level device on said gyroscope responsive to tilt for differentially controlling the current through said coil means, and means for supplying alternating current to said controller and direct current to said coil means controlled from said controller from said alternating current supply, comprising two groups of rectifier bridges supplied from said supply, one group having its alternating current input connected through said controller and its direct current output connected to one winding of a group of saturable reactors and the input of the second group being connected through the alternating current winding of said saturable reactors and the direct current output connected to said coil means to reversibly and variably excite the same to create a magnetic field in one direction or the other of varying strength in accordance with the direction and amount of tilt of the gyroscope.

10. Controlling means for a gyroscope comprising, the combination with a rotor bearing frame mounted for freedom about two perpendicular normally horizontal axes, two fixed coaxial coils on opposite sides of said frame with their axes normally in line with one of said gyro axes, a permanent magnet secured to said gyroscope on each side thereof, one adjacent each coil, each magnet being symmetrically placed with respect to said axis and having their poles facing in opposite directions, and means for controllably exciting said coils in the opposite direction.

11. Controlling means for a gyroscope comprising the combination with a rotor bearing frame mounted for freedom about two perpendicular normally horizontal axes, two pairs of fixed coils, one pair being coaxial with one of said axes and the other pair with the other of said axes and the individual members of each pair being on opposite sides of said frame, two pairs of permanent magnets secured to said gyroscope providing a magnet adjacent each coil, the members of each pair of magnets having their poles facing in opposite directions, and means for controllably exciting the members of each pair of coils in opposite directions.

12. Erecting means for gyro-verticals for aircraft having a rotor casing mounted in neutral equilibrium for oscillation about a pair of mutually perpendicular horizontal axes, one of which normally lies fore and aft on the craft, a pair of spaced fixed coils placed adjacent the forward and rearward end of the gyroscope and coaxial with said fore and aft axis, a magnet secured to said casing adjacent each coil, said magnets having their poles facing in opposite directions, and gravitationally responsive means for controllably and oppositely exciting said coils.

13. In a universally maneuverable gyro vertical having a casing, a frame, and a rotor carried by the frame mounted in the casing with complete freedom about normally mutually perpendicular spin, precession and torque axes; means for precessing said frame comprising a pair of connected coils fixed to the casing producing a field along the spin axis of the rotor, a second pair of coils fixed to the frame spaced on opposite sides of the torque axis producing a field along the precession axis of the rotor, and means responsive to tilt of the rotor about its precession axis for controlling the polarity of each of the second pair of coils.

14. In a universally maneuverable gyro vertical, a rotor frame with mutually perpendicular major and minor horizontal axes of support including a first pair of connected coils mounted on opposite sides of said frame, the magnetic field of which is situated along the major axis of the frame, a second pair of connected coils mounted on opposite sides of said frame, the magnetic field of which is situated along the minor axis of the frame, and a tilt responsive switch mounted on said frame for differentially controlling the energization of said coils.

15. In a universally maneuverable gyro vertical having a casing, a frame, a rotor carried by the frame mounted in the casing with complete freedom about normally mutually perpendicular spin, precession and torque axes; precessing means for said frame comprising a pair of connected coils fixed to the casing on opposite sides of the torque axis producing a field along the precession axis, means responsive to tilt of the rotor about the precession axis for controlling the polarity of the field of said coils, and a pair of magnets fixed to the frame of oppositely arranged polarities spaced on opposite sides of the torque axis and producing a field along the spin axis of the rotor.

16. In a universally maneuverable gyro vertical, a rotor frame with mutually perpendicular major and minor horizontal axes of support having a first pair of vertically disposed magnets arranged in polar opposition mounted on opposite sides of the frame and situated at the major axis of the frame, and a second pair of vertically disposed magnets arranged in polar opposition mounted on opposite sides of said frame and situated at the minor axis of the frame.

17. In a universally maneuverable gyro vertical having a casing, a rotor frame carried in the casing on mutually perpendicular major and minor horizontal axes of support; precessing means for said frame including first and second electrical means equidistantly spaced on opposite sides of the minor axis normally producing a magnetic field along the major axis, third and fourth electrical means equidistantly spaced on opposite sides of the major axis normally producing a magnetic field along the minor axis, and a tilt responsive switch mounted on said frame for differentially controlling said first and second electrical means and said third and fourth electrical means.

18. A gyro vertical as claimed in claim 17, in which said first and second electrical means and said third and fourth electrical means are mounted in the casing.

19. A gyro vertical as claimed in claim 17, in which said first and second electrical means and said third and fourth electrical means are mounted on the frame.

ROBERT HASKINS, Jr.
ORLAND E. ESVAL.
ROBERT S. CURRY, Jr.